(12) United States Patent
Pengg et al.

(10) Patent No.: US 8,813,468 B2
(45) Date of Patent: Aug. 26, 2014

(54) CHAIN CONSISTING OF OVAL PROFILE CHAIN LINKS, AND METHOD FOR PRODUCING A CHAIN OF THIS TYPE

(75) Inventors: Aegyd Pengg, Klagenfurt (AT); Franz Fuchs, Kapfenberg (AT)

(73) Assignee: Pewag Austria GmbH, Kapfenberg (AT)

( * ) Notice: Subject to any disclaimer, the term of this patent is extended or adjusted under 35 U.S.C. 154(b) by 0 days.

(21) Appl. No.: 14/003,226

(22) PCT Filed: Mar. 7, 2011

(86) PCT No.: PCT/EP2011/001114
§ 371 (c)(1),
(2), (4) Date: Sep. 4, 2013

(87) PCT Pub. No.: WO2012/119613
PCT Pub. Date: Sep. 13, 2012

(65) Prior Publication Data
US 2013/0333348 A1    Dec. 19, 2013

(51) Int. Cl.
*F16G 13/12* (2006.01)
*F16G 15/12* (2006.01)
*B21L 5/02* (2006.01)

(52) U.S. Cl.
USPC .................. 59/84; 59/35.1; 59/90; 59/93

(58) Field of Classification Search
USPC ........... 59/18, 20, 22, 25, 31, 35.1, 78, 82, 84
See application file for complete search history.

(56) References Cited

U.S. PATENT DOCUMENTS

| | | | | |
|---|---|---|---|---|
| 2,650,470 A | * | 9/1953 | Sennholtz | 59/90 |
| 3,453,823 A | * | 7/1969 | Mundt | 59/90 |
| 3,662,539 A | * | 5/1972 | Florjancic | 59/80 |
| 3,744,239 A | * | 7/1973 | I'Anson | 59/84 |
| 4,627,232 A | * | 12/1986 | Bruce | 59/84 |
| 5,956,936 A | * | 9/1999 | Ianello et al. | 59/90 |
| 8,127,523 B2 | | 3/2012 | Pengg et al. | |
| 8,186,141 B2 | | 5/2012 | Cerjak et al. | |
| 2006/0053766 A1 | | 3/2006 | Berghoff et al. | |

FOREIGN PATENT DOCUMENTS

| | | |
|---|---|---|
| DE | 32 12 360 C1 | 7/1983 |
| DE | 35 14 103 A1 | 10/1986 |
| DE | 198 06 719 A1 | 10/1998 |
| DE | 20 2005 010 844 U1 | 12/2006 |
| DE | 10 2007 061 512 A1 | 7/2009 |
| DE | 10 2008 034 360 A1 | 2/2010 |
| WO | WO 2009/080289 A1 | 7/2009 |

* cited by examiner

*Primary Examiner* — David B Jones
(74) *Attorney, Agent, or Firm* — Christensen Fonder P.A.

(57) ABSTRACT

A chain has alternating vertical and horizontal chain links and with each link having an oval profile. The vertical links having an end web supporting surface formed on its inside that engages with a complementary bearing surface on the end web of adjacent horizontal link. The supporting surfaces and the bearing surfaces of all end webs are widened beyond two lateral surfaces of the respective end web, and supporting surfaces and bearing surfaces associated with one another are formed in each case as complementary cylindrical surfaces extending between longitudinal limbs. A method for producing such, closed profile chain links are hooked into open profile chain links and then the latter are closed by welding. And wherein, all supporting surfaces and bearing surfaces associated with one another are formed in each case as cylindrical surfaces that complement one another.

17 Claims, 2 Drawing Sheets

CHAIN CONSISTING OF OVAL PROFILE CHAIN LINKS, AND METHOD FOR PRODUCING A CHAIN OF THIS TYPE

PRIORITY CLAIM

The present application is a National Phase entry of PCT Application No. PCT/EP2011/001114, filed Mar. 7, 2011, the disclosure of which is hereby incorporated by reference herein in its entirety.

FIELD OF THE INVENTION

This invention relates to chains formed of oval profile chain links.

BACKGROUND OF THE INVENTION

Chains consisting of oval profile chain links are known in which the cross-sections of the sectional steels used, in particular on the end webs connecting the longitudinal limbs of the chain links at their ends, have a circular cross-section (US 2006/0053766 A1, DE 2007 061 512 A1).

In other known chains (DE 10 2008 034 360 A1), although the cross-sections of the end webs do not have a circular cross-section, they are formed circularly rounded on their sides facing the inner opening of the chain link in question.

In both cases, however, this has the result, when a finished chain is under tension, that the end webs in each case of two chain links engaging in one another come into contact engagement with one another on their insides, with their bearing or supporting surfaces provided there, wherein the insides of the end webs of one chain link rest against the inside of the end webs of the other chain links, arranged swivelled by 90° to them about their longitudinal axis. On such end webs, resting against one another, of in each case two chain links hooked into one another, articulation points are formed which become active when the round steel chain in question carries out a change of direction under load, for instance when running around a guide roller or during other changes of direction taking place under load. This results in the occurrence of wear at such articulation points of round steel chains under load, which can, in the end, result in the need to at least replace chain links worn out at the end webs of the articulation points, if not the need to replace the entire chain.

To produce such chains, it is known (DE 10 2007 061 512 A1), for the individual chain links, to convert corresponding profile or round steel sections into a shape corresponding to the desired chain link shape (oval, round), to hook them into one another and then connect the end faces of the pre-bent sectional steel sections to one another by welding. Since each individual chain link here has to be pre-bent into an open shape and then closed later by welding, the production of such chains is expensive.

A method of the type named at the start for producing chain links is known from DE 32 12 360 C1, in which closed chain links are hooked into open chain links and then the open chain links are closed by resistance butt welding. Used as open chain links are those chain links which consist of a U-shaped lower part and a rod-shaped upper part, wherein the ends to be welded together of the lower and upper parts of the open chain links are provided, before the welding, with substantially roof-shaped tapers, the apexes of which intersect in the welding position. As a result of this design, the conductive connection between the upper and the lower part is improved and an intensive heating in the area of the weld points is achieved, wherein small unintended shifts during assembly do not adversely affect the strength of the weld point. In this method only every second chain link is welded, whereby the manufacturing efficiency of the welding machine used is doubled compared with the known methods in which every chain link has to be welded. However, the particular design of the end faces of the U-shaped lower part as well as of the underside of the rod-shaped upper part requires an additional outlay.

The use, recommended there, of round stock on the end webs of these known chain links moreover also does not yield any improvements with respect to the life of these chain links due to joint wear.

Starting from here, the task of the invention is to improve a chain of the type named at the beginning such that the available wear volume in the joints is enlarged and thus the life of the individual chain links is increased.

In addition, the object of the invention is also to propose a method for producing such a chain which can be carried out simply and in which the production outlay is particularly low.

SUMMARY OF THE INVENTION

A chain consisting of oval profile chain links, in which each end web connecting the two longitudinal limbs of a chain link to one another at an end side of same is supported, with a cylindrical supporting surface formed on its inside, on a cylindrical bearing surface provided on the inside of the associated end web of the hooked-in adjacent profile chain link. The invention further relates to a method for producing such chains, in which closed profile chain links are hooked into open profile chain links and then the latter are closed by welding, wherein when the chain is in the finished state each end web connecting the two longitudinal limbs of each chain link to one another at an end side of same is supported, with a cylindrical supporting surface formed on its inside, on a cylindrical bearing surface provided on the inside of the associated end web of the hooked-in adjacent profile chain link.

According to embodiments of the invention, it is provided that the supporting surfaces and the bearing surfaces of all end webs are widened in each case laterally beyond the two lateral boundary surfaces of the end web in question, and supporting and bearing surfaces associated with one another are formed in each case as cylindrical surfaces that complement one another over the entire width of these widened surfaces.

With the profile chain according to the invention, the special design of the end webs, namely their supporting surfaces or their bearing surfaces which are widened laterally beyond the two lateral boundary surfaces of the end web in question and are formed in each case as cylindrical surfaces that complement one another over the entire width of these widened surfaces, means that these supporting and bearing surfaces resting on one another under load and in each case forming an articulation point between two successive chain links are much larger surfaces than in the case of pure round links and provide a substantially larger wear volume in the joint than in the case of a round steel chain (with equal breaking force). However, owing to the enlarged surface, the surface pressure acting under a load is also reduced by this design optimization according to the invention of the joint, which in turn results in a more favorable wear behavior than in the case of pure round steel chains. Because, at such an articulation point between the two profile chain links hooked into one another, the supporting surface on the end web of one chain link and the bearing surface on the end web of the other chain link are not only widened laterally, but in each case are formed as cylindrical surfaces that complement one another substantially over the entire width of this widened surface, so that the supporting surface of one chain link has a (namely circular) curvature only in planes lying parallel to the clamping surface of same, while the bearing surface on the other chain link is provided with a complementary curvature in the shape of a circular segment only in planes perpendicular to its clamping surface, thus two cylindrical surfaces which interlink form the articulation point, forces acting in the load direction of the chain between the supporting surfaces and bearing surfaces running on one another are transferred between the chain links in each case in radial direction, which means a favorable introduction or discharge into or out of the respective end web. Owing to the cylindrical shape of the joint bearing points running on one another, a very uniform stress also occurs in the bearing surfaces, as, seen over the width of the bearing surface, in each case equally large local relative speeds occur between the two bearing surfaces, thus a very uniform local speed is also present over the bearing surfaces, which likewise results in a very uniform, favorable wear behavior.

The chain links can preferably be produced by forging or also casting or also by sintering, wherein as a result of these production methods the special shape of the chain links can very advantageously be freely adapted to the defined purpose of the chain (for lifting, conveying or fastening).

If, in the case of a chain according to the invention, the individual chain links are used as vertical links and as horizontal links, in the case of the profile chain links serving as vertical links the widening of their supporting surface is preferably provided substantially along the entire curved course of the respective end web.

Likewise advantageously, in the case of the profile chain links serving as horizontal links, their bearing surfaces are formed such that they run around the respective end web on its inside and its two lateral boundary surfaces up to a circumferential surface bordering the chain link in question on its outside.

Particularly in the case of a chain according to the invention, the vertical links consist of profile chain half links connected to one another by welding, in particular by friction welding.

The chains according to the invention have, at the articulation points between two chain links hooked into one another, an advantageous formation of the bearing surfaces running on one another between the two end webs running on one another there when the chains are under load, through which a particularly favorable wear behavior, a lower specific load than in the case of profile links with round profile and thus also a much longer life for the articulation points are achieved.

The method according to the invention provides, in the case of a method for producing chain links of the type named at the beginning, for profile chain half links which are designed as half links separated in the area of the center of the longitudinal limbs of a chain link perpendicular to the clamping plane of same to be used as open chain links, wherein the supporting surfaces and the bearing surfaces of all end webs are widened in each case laterally beyond the side flanks of the end web in question, and supporting and bearing surfaces associated with one another are formed in each case as cylindrical surfaces that complement one another over the entire width of these widened surfaces.

In the production method according to the invention also only every second chain link is closed by welding, whereby the manufacturing efficiency of the corresponding welding machine is doubled compared with the production method in which every chain link has to be closed by welding.

However, it is not necessary to use different individual partial links for the open chain links and weld them together, as is the case in the production method described at the beginning. Rather, in the production method according to the invention the great advantage is achieved that only one form of partial links, in the form of half links, need be used for the formation of the open chain links, which is favorable, not only for the production, but also for the storage, because there is no need to provide and use differently formed partial links. The end faces to be welded together in each case of two half links facing one another also lie inside a chain link symmetry plane, which is favorable for carrying out the welding process.

Any suitable welding process can be used to connect the half links.

However, for the connection of in each case two profile chain half links to create a closed profile chain link, friction welding has proved to be quite particularly advantageous as well as quick and favorable to carry out, wherein here linear friction welding is, again quite particularly preferably, used.

If work is done by means of friction welding, the great advantage can be achieved that, for the profile chain links, those made of plastic can also be readily used.

DETAILED DESCRIPTION

In the following description of the figures, parts with the same function in the various figures are also always provided with the same reference numbers.

Figure 1:
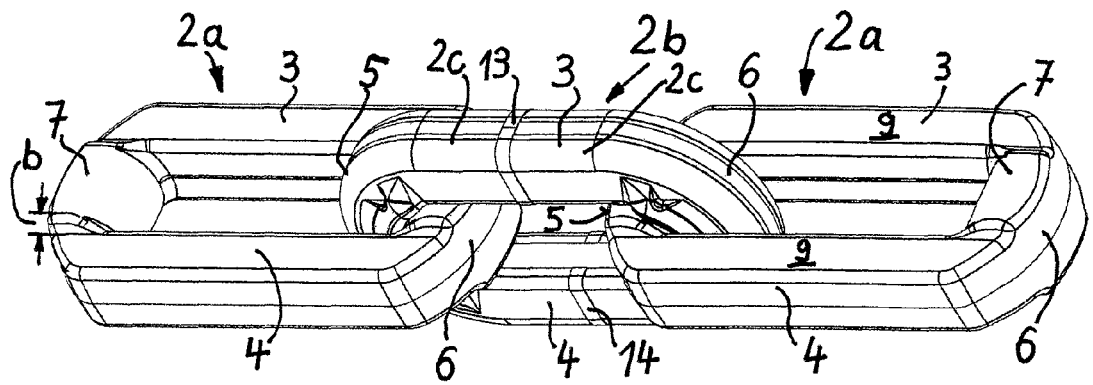
FIG. 1 is the perspective view of a section, consisting of four successive chain links, of a profile chain according to the invention.

Firstly, in FIG. 1 a section from a chain 1 is shown in perspective representation, which comprises, in alternating sequence, two horizontal profile chain links 2a as well as two vertical profile chain links 2b, wherein in each case a vertical link 2b connects two horizontal links 2a, into which it is hooked in each case.

The horizontal links 2a and the vertical links 2b are elongate, oval profile chain links made of material that is not circular in cross-section, which will be discussed in detail below.

As FIG. 1 likewise shows, the horizontal links 2a are designed as one-piece, closed chain links, while the vertical links 2b consist in each case of two profile chain half links 2c which are welded together along weld points 13, 14 on their end faces 11, 12 facing one another (cf. FIG. 7) to form a closed vertical link 2b.

Figure 6:
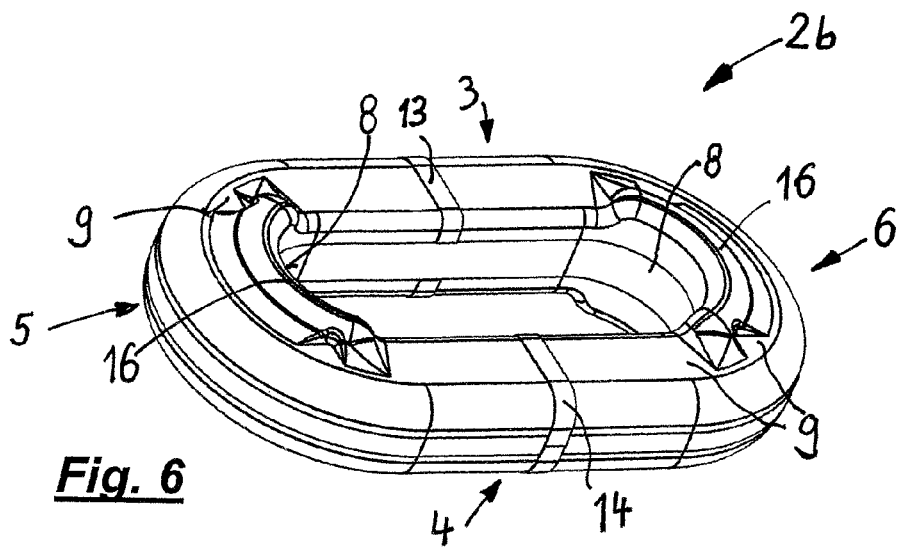
FIG. 6 is an enlarged perspective view of a chain link (vertical link) of a chain according to the invention.

The half links 2c are formed such that each of same represents one half of a vertical link 2b, with the result that, after welding of the two half links 2c to form a closed vertical link 2b, the weld points 13, 14 on the side limbs 3 and 4 that form then are in each case arranged in the center and aligned relative to one another in a center plane corresponding to FIG. 6.

The chain 1 is produced such that in each case a profile chain half link 2c is hooked into a closed chain link (horizontal link 2a), on its two end webs 5, 6 (cf. FIG. 2), through the center opening of the closed horizontal link 2a in question, namely in such a way that the free limbs of the two hooked-in profile chain half links 2c run in opposite directions to one another.

Then, as can be seen from FIG. 1, the profile chain half links 2c hooked in on two successive horizontal links 2a are welded together in a suitable manner, with their end faces 11 and 12 facing one another, at the end of their limbs 3 and 4, with the result that a closed vertical link 2b connecting the two horizontal links 2a forms.

Any suitable welding process can be used to weld the two profile chain half links 2c together.

However, it has proved to be quite particularly advantageous if the welding at the weld points 13 and 14 is carried out by means of a friction welding process, and here quite particularly preferably by means of a linear friction welding process. Since the weld points 13 and 14 on the limbs 3 and 4 of the respective horizontal link 2b are arranged centrally, aligned relative to one another and attached in a center plane as separation plane, a simultaneous linear friction welding of the two weld points 13 and 14 can be carried out quickly and favourably in one process.

This is even possible if the profile chain half links 2c consist, not of a metal, but e.g. of a plastic, since friction welding or linear friction welding can also be carried out without difficulty on plastic parts.

Figure 2:
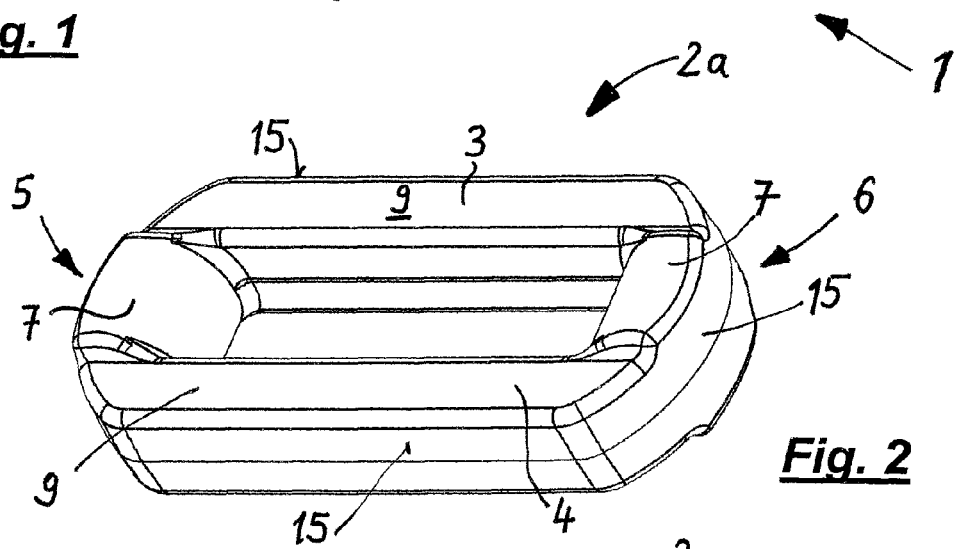
FIG. 2 is an (enlarged) perspective view of a chain link (horizontal link) of a chain according to the invention.

An (enlarged) perspective representation of a horizontal link 2a is shown in FIG. 2 and such a representation of a vertical link 2b is shown in FIG. 6.

Figure 3:
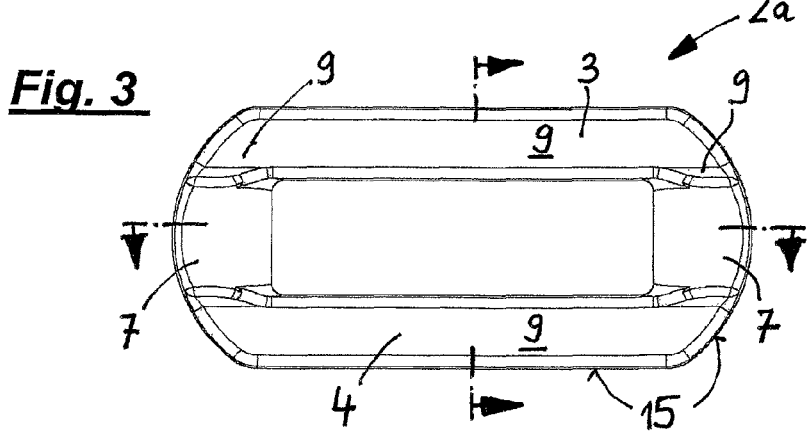
FIG. 3 is a top view of the profile chain link according to FIG. 2.
Figure 4:
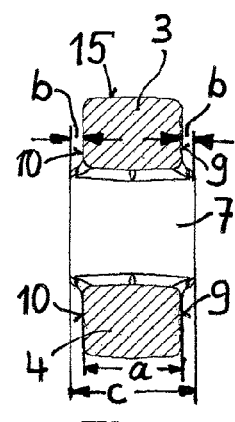
FIG. 4 is a sectional representation according to cut layer E-E in FIG. 3.
Figure 5:
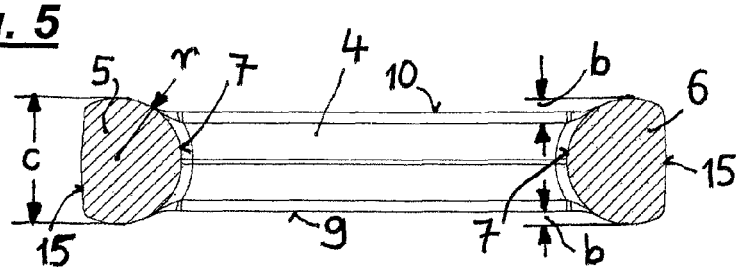
FIG. 5 is a sectional view according to cut layer D-D from FIG. 3.

Of the perspective representation of the horizontal link 2a according to FIG. 2, FIG. 3 shows a top view, FIG. 4 a sectional view along cut plane E-E in FIG. 3 and FIG. 5 a sectional view along cut plane D-D likewise in FIG. 3.

The side limbs 3 and 4 are bordered on both sides by lateral boundary surfaces 9 (FIG. 2) on one side and 10 (FIGS. 4 and 5) on the other.

The end webs 5 and 6 also have these lateral boundary surfaces 9 and 10, namely in the area in which the side webs 3 and 4 pass into the respective end web 5 or 6, as can be seen well from the representation from FIG. 5.

On each side of the horizontal link 2a these lateral boundary surfaces 9 and 10 in each case lie inside one plane.

On the side facing the inner opening of the chain link 2a, a bearing surface 7 is formed in each case on the end limbs 5 and 6 which, as can be seen from the representation from FIG. 5, has a cross-section in the shape of a circular segment and runs around the respective end web 5 or 6 on its inside as well as on its two outsides in each case up to the junction with a circumferential surface 15 running around the entire chain link 2a on the outside.

As can be seen particularly well from FIG. 5, the cylindrical bearing surface 7 on both end webs 5, 6 has a course that protrudes laterally by an amount b from both lateral boundary surfaces 9 and 10 of the end webs 5 and 6 (and also of the longitudinal limbs 3 and 4). As a result, a bearing surface 7 forms on each of the side limbs 5 and 6, on which the corresponding supporting surface 8 of the hooked-in vertical link 2b (cf. FIGS. 6 and 7), which has a likewise cylindrical, complementary shape, can be supported in sliding manner over the full laterally enlarged width c.

Since the bearing surfaces 7 on the side limbs 5 and 6 of the horizontal links 2a are cylindrical surfaces which run in a curve only in the plane of the image represented in FIG. 5, but do not have a curvature perpendicular to this, this thus means that, for the total width c of these cylindrical bearing surfaces 7, an effective bearing width with a size of $$c=a+2b$$

is available, wherein a denotes the distance between the lateral boundary surfaces 9 and 10 of the horizontal link 2a, b denotes the lateral projection over which, on each side, the bearing surfaces 7 protrude beyond the lateral boundary surfaces 9 and 10 of the end webs 5 and 6 respectively (and thus also the side webs 9 and 10), and c denotes the entire effective bearing width perpendicular to the clamping plane of the horizontal link 2a.

Reference may now be made to FIGS. 6 to 9, in which a vertical link 2b is illustrated in enlarged representation:

This vertical link also comprises two side limbs 3, 4 which are connected to one another at their ends in each case via an end web 5 or 6 curved in a semi-circle.

Figure 8:
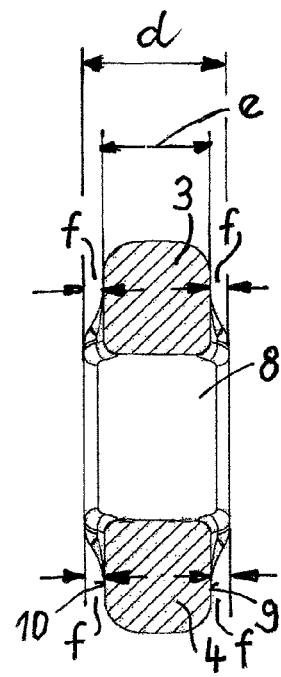
FIG. 8 is a section along cut plane F-F in FIG. 7.
Figure 9:
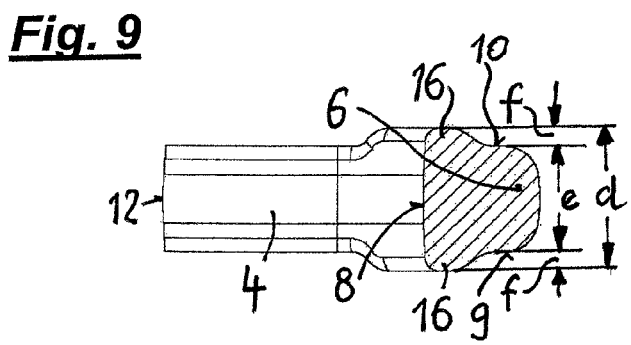
FIG. 9 is a sectional representation according to cut plane G-G in FIG. 7.

The end webs 5 and 6 have on their inside facing the inner opening of the vertical link 2b a supporting surface 8 which, as FIG. 6 shows very well, is likewise formed cylindrical. This supporting surface 8, as can be seen from FIGS. 6, 8 and 9, is widened by means of outwardly directed bulges 16 by a projection f (cf. FIGS. 8 and 9) over the lateral boundary surfaces 9, 10 of the end webs 5, 6, which in turn lie in a common plane with the lateral boundary surfaces of the longitudinal limbs 3 and 4 on each side of the chain link 2b. Again, a significant enlargement of the effective bearing width d of the supporting surface 8 is thus achieved in the direction of the center axis of the cylindrical shape:

$$d=e+2f,$$

wherein e denotes the distance between the lateral boundary surfaces 9 and 10 of the vertical link 2b (cf. FIG. 5).

The vertical links 2b are assembled, however, not in the closed state, but in an opened state with the horizontal links 2a, namely such that in each case two halves of vertical links 2c are hooked into a closed horizontal link 2a on their two end webs 5 and 6.

Figure 7:
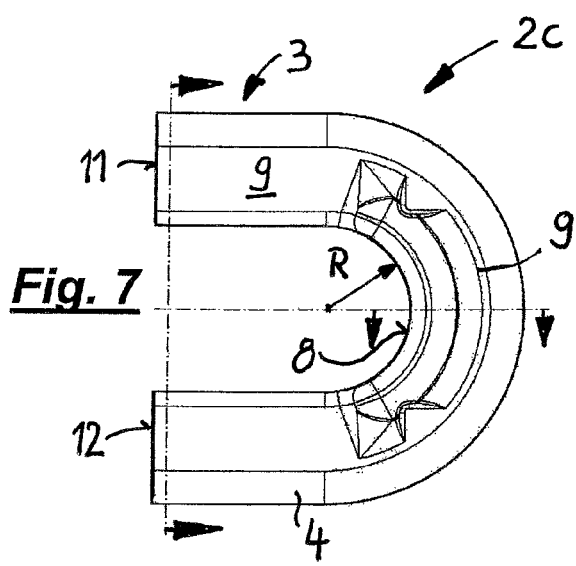
FIG. 7 is a top view of a profile chain half link cut through the center area of the side limbs of the chain link according to FIG. 6.

FIG. 7 shows a top view of such a profile chain half link 2c, wherein FIGS. 8 and 9 show sectional representations of this half link corresponding to the cut lines F-F (FIG. 8) and G-G (FIG. 9).

Each profile chain half link 2c is thus hooked into a (closed) horizontal link 2a (corresponding to FIGS. 2 to 5) for assembly, namely in a clamping plane rotated by 90° relative to said horizontal link about its longitudinal center axis, with the result that the bearing surface 8 of the vertical link 2b comes to bear in sliding manner against the bearing surface 7 of the horizontal link 2a on the end limb 5 or 6 in question. The radius r of the bearing surfaces 7 is chosen to complement the radius R, with the result that both radii r, R can attain a good bearing supported on one another rotationally movable in the sense of a swivel joint.

The lateral projections f in the case of the supporting surfaces 8 of the vertical link 2b as well as the total width d of the supporting surfaces 8 and also the distance e between the lateral boundary surfaces 9 and 10 are chosen in the case of the vertical link 2b such that an unimpeded interlocking of vertical links (2b) and horizontal links (2a) is achieved.

As FIG. 6 shows, the bulges 16 widening the supporting surface 8 laterally and protruding over the lateral boundary surfaces 9 and 10 are formed substantially along the entire curved course of the end webs 5 and 6.

These lateral projections b and f from bearing surfaces 7 and supporting surfaces 8 beyond the lateral boundary surfaces 9, 10 of the end webs 5, 6 thus provide a significant enlargement of the effective bearing surface compared with the case of pure round steel links, wherein the design of these bearing surfaces 7 and 8 in the case of the horizontal links 2a and the vertical links 2b in the form of cylindrical surfaces 7 and 8 that slide on one another and are supported against one another not only creates a much larger wear volume than in the case of round steel chain links, but moreover the friction ratios resulting in the case of cylindrical friction surfaces, with a local speed distribution that is completely uniform over the width of the friction surface, also result in particularly favorable friction conditions. The enlargement of the effective bearing surface compared with chain links with pure circular cross-sections also yields, when a particular tensile load applies, a reduced surface pressure inside this joint bearing compared with the case of a pure round steel chain, which is likewise favorable with respect to the wear properties of a joint formed in such a way.

The invention claimed is:

1. A chain comprising alternating horizontal links and vertical links, each horizontal and vertical link having an oval profile and comprising a pair of end webs connecting two longitudinal limbs, each vertical link having a pair of supporting surfaces formed on an inside of the pair of respective end webs, each horizontal link having a pair of bearing surfaces formed on an inside of the pair of respective end webs,
   wherein each of the supporting surfaces includes a cylindrical shape, each cylindrical shape being centered about a respective linear center axis and extending a first length parallel to the linear center axis of the cylindrical shape, and
   wherein each of the bearing surfaces defines a cylindrical shape, each cylindrical shape being centered about a respective linear center axis and extending a second length parallel to the linear center axis of the cylindrical shape, each cylindrical shape complementing the cylindrical shape of each supporting surface.

2. The chain of claim 1 wherein the supporting surfaces and the bearing surfaces of all end webs are widened in each case in a direction perpendicular to the oval profile compared to the two longitudinal limbs.

3. The chain of claim 1 wherein each longitudinal limb of each link has two lateral boundary surfaces and respective end web having a thickening compared to the boundary surfaces.

4. The chain according to claim 1, wherein each chain link is a forged chain link.

5. The chain according to claim 1, wherein each chain link is a cast link.

6. The chain according to claim 1, wherein each chain link is a sintered link.

7. The chain according to claim 1, wherein each of the vertical links has a widening of their supporting surfaces compared to a width of the longitudinal limbs, said widening substantially along an entire curved course of each respective end web.

8. The chain according to claim 7, each of the horizontal links has a the widening of their bearing surfaces compared to a width of the longitudinal limbs, said widening substantially along an entire curved course of each respective end web.

9. The chain according to claim 1, wherein each vertical link comprises a pair of profile chain half links connected to one another by welding.

10. The chain of claim 1, wherein each vertical link includes lateral boundary surfaces defining a distance therebetween, and wherein the second length is at least as long as the distance between the lateral boundary surfaces.

11. A chain comprising alternating horizontal links and vertical links, each horizontal and vertical link comprising a pair of end webs connecting two longitudinal limbs, each vertical link having with a pair of supporting surfaces formed on an inside of the pair of respective end webs, each horizontal link having a pair of bearing surfaces formed on an inside of the pair of respective end webs,
   wherein each of the supporting surfaces includes a cylindrical shape, each cylindrical shape being centered about a respective linear center axis that extends a first length parallel to the linear center axis of the cylindrical shape, and
   wherein each of the bearing surfaces defines a cylindrical shape, each cylindrical shape being centered about a respective linear center axis that extends a second length parallel to the linear center axis of the cylindrical shape, each cylindrical shape complementing the cylindrical shape of each supporting surface.

12. A method for producing chains according to claim 11, wherein each vertical link is initially two half links, and the method comprising hooking a half link into a pair of open profile chain links and then closing the half link by welding with another half link to form a vertical link.

13. A method for producing chains comprising a plurality of vertical links and a plurality of horizontal links, the vertical links and horizontal links connected in an alternating manner, the method comprising:
   providing a plurality of open profile half links, each half link are separated in the area of longitudinal limbs and perpendicular to a clamping plane, each open profile half link having end web widened beyond side surfaces and comprising one of a cylindrical bearing surface and a cylindrical support surface that complement each other, said one of said cylindrical bearing surface and said cylindrical support surface being centered about a linear center axis that extends a length and;
   providing closed links, and wherein each closed link having a pair of end webs widened beyond side surfaces and each web having the other of a cylindrical bearing surfaces and a cylindrical support surface;
   hooking open profile half link into open profile chain links and then closing said open profile half link by connecting with another open profile half link.

14. Method according to claim 13, further comprising welding in each case the open profile half links.

15. Method according to claim 14, further comprising friction welding the two open profile half links.

16. Method according to claim 14, further comprising linear friction welding for the friction welding.

17. Method according to claim 15, further comprising selecting open profile half links formed from plastic.

* * * * *